US012098594B2

(12) United States Patent
Colson et al.

(10) Patent No.: US 12,098,594 B2
(45) Date of Patent: *Sep. 24, 2024

(54) COVERING FOR ARCHITECTURAL OPENINGS WITH COORDINATED VANE SETS

(71) Applicant: Hunter Douglas, Inc., New York, NY (US)

(72) Inventors: Wendell B. Colson, Weston, MA (US); Paul G. Swiszcz, Niwot, CO (US); James M. Anthony, Denver, CO (US)

(73) Assignee: HUNTER DOUGLAS INC., New York, NY (US)

( * ) Notice: Subject to any disclaimer, the term of this patent is extended or adjusted under 35 U.S.C. 154(b) by 622 days.

This patent is subject to a terminal disclaimer.

(21) Appl. No.: 16/588,190

(22) Filed: Sep. 30, 2019

(65) Prior Publication Data

US 2020/0024897 A1 Jan. 23, 2020

Related U.S. Application Data

(63) Continuation of application No. 15/339,445, filed on Oct. 31, 2016, now Pat. No. 10,443,304, which is a (Continued)

(51) Int. Cl.

*E06B 9/24* (2006.01)
*E06B 9/262* (2006.01)

(Continued)

(52) U.S. Cl.

CPC ................ *E06B 9/34* (2013.01); *E06B 9/262* (2013.01); *E06B 9/264* (2013.01); *E06B 9/386* (2013.01);

(Continued)

(58) Field of Classification Search

CPC .... E06B 2009/2345; E06B 9/34; E06B 9/262; E06B 9/264; E06B 9/386; E06B 9/42; E06B 2009/2405; E06B 2009/2627

See application file for complete search history.

(56) References Cited

U.S. PATENT DOCUMENTS 4,039,019 A 8/1977 Hopper
4,194,550 A 3/1980 Hopper (Continued)

FOREIGN PATENT DOCUMENTS

CA 2378199 C † 6/2009
CN 1263413 C † 7/2006

(Continued)

OTHER PUBLICATIONS

Office Action dated Office Action dated Dec. 10, 2019 received from the Chinese Patent Office from related Chinese Patent Application No. CN201810199146.1.

(Continued)

*Primary Examiner* — Johnnie A. Shablack
*Assistant Examiner* — Jeremy C Ramsey
(74) *Attorney, Agent, or Firm* — Scully, Scott, Murphy & Presser, P.C.

(57) ABSTRACT

A covering for an architectural opening including a roller, an end rail, and a panel rotatable onto the roller and spanning between the roller and the end rail. The panel includes a front sheet, a rear sheet, and a cell spanning between the front and rear sheet. When the front sheet is at a first position relative to the rear sheet, the cell is open. When the front sheet is at a second position relative to the rear sheet, the cell is closed.

60 Claims, 15 Drawing Sheets

Related U.S. Application Data continuation of application No. 13/830,241, filed on Mar. 14, 2013, now Pat. No. 9,512,672.

(60) Provisional application No. 61/727,838, filed on Nov. 19, 2012.

(51) Int. Cl.

| | |
|---|---|
| ***E06B 9/264*** | (2006.01) |
| ***E06B 9/34*** | (2006.01) |
| ***E06B 9/386*** | (2006.01) |
| ***E06B 9/42*** | (2006.01) |

(52) U.S. Cl.

CPC ........ *E06B 9/42* (2013.01); *E06B 2009/2405* (2013.01); *E06B 2009/2435* (2013.01); *E06B 2009/2627* (2013.01)

(56) References Cited

U.S. PATENT DOCUMENTS

| | | | | |
|---|---|---|---|---|
| 4,694,144 | A * | 9/1987 | Delaroche | E06B 9/262 160/84.01 |
| 5,419,385 | A | 5/1995 | Vogel et al. | |
| 5,482,750 | A | 1/1996 | Colson et al. | |
| 5,503,210 | A | 4/1996 | Colson et al. | |
| 5,547,006 | A | 8/1996 | Auger | |
| 5,664,613 | A * | 9/1997 | Jelic | E06B 9/262 160/84.05 |
| 5,974,763 | A | 11/1999 | Colson et al. | |
| 6,068,039 | A | 5/2000 | Judkins | |
| 6,302,982 | B1 | 10/2001 | Corey et al. | |
| 6,345,486 | B1 | 2/2002 | Colson et al. | |
| 6,484,786 | B1 * | 11/2002 | Ruggles | E06B 9/266 160/84.05 |
| 6,688,369 | B2 † | 2/2004 | Colson | |
| 6,904,948 | B2 | 6/2005 | Auger et al. | |
| 6,959,750 | B2 † | 11/2005 | Colson | |
| 7,169,459 | B2 | 1/2007 | Lichodziejewski et al. | |
| 7,194,846 | B2 | 3/2007 | Swiszcz et al. | |
| 7,694,696 | B2 | 4/2010 | Chang et al. | |
| 8,056,373 | B2 | 11/2011 | Kazuma | |
| 8,261,807 | B2 | 9/2012 | Dann et al. | |
| 8,327,906 | B2 | 12/2012 | Kwak | |
| 2001/0054490 | A1 * | 12/2001 | Corey | E06B 9/28 160/236 |
| 2002/0088559 | A1 | 7/2002 | Green et al. | |
| 2003/0029577 | A1 * | 2/2003 | Palmer | E06B 9/262 160/84.05 |
| 2005/0155722 | A1 | 7/2005 | Colson et al. | |
| 2007/0175596 | A1 | 8/2007 | Chien | |
| 2008/0053625 | A1 | 3/2008 | Anthony | |
| 2010/0132896 | A1 | 6/2010 | Kazuma | |
| 2010/0212844 | A1 * | 8/2010 | Chien | E06B 9/266 160/405 |
| 2010/0218841 | A1 | 9/2010 | Chang et al. | |
| 2012/0018108 | A1 | 1/2012 | Lin | |
| 2012/0222828 | A1 | 9/2012 | Kwak | |
| 2012/0318465 | A1 | 12/2012 | Colson | |

FOREIGN PATENT DOCUMENTS

| | | | | |
|---|---|---|---|---|
| CN | 101371002 | A | 2/2009 | |
| CN | 201963135 | U | 9/2011 | |
| DE | 3525515 | A * | 1/1987 | E06B 9/262 |
| DE | 3525515 | A1 | 1/1987 | |
| EP | 2216433 | A2 | 8/2010 | |
| JP | H06-73970 | A | 3/1994 | |
| JP | 2614378 | B2 | 5/1997 | |
| JP | 2010523838 | A * | 7/2010 | E06B 9/28 |
| KR | 10-2010-0090818 | A | 8/2010 | |

OTHER PUBLICATIONS

Office Action dated Oct. 21, 2019 received from the Korean Intellectual Property Office from related Korean Patent Application No. 10-2013-0140689, 18 pages.

* cited by examiner
† cited by third party

COVERING FOR ARCHITECTURAL OPENINGS WITH COORDINATED VANE SETS

CROSS-REFERENCE TO RELATED APPLICATION

This application is a continuation of U.S. application Ser. No. 15/339,445, filed Oct. 31, 2016, which is a continuation of U.S. application Ser. No. 13/830,241, filed Mar. 14, 2013, now U.S. Pat. No. 9,512,672 issued Dec. 6, 2016, which claims the benefit, under 35 U.S.C. § 119(e), of U.S. provisional application No. 61/727,838, entitled "Covering For Architectural Openings With Coordinated Vane Sets" and filed on Nov. 19, 2012, which are hereby incorporated in their entirety by reference herein.

TECHNICAL FIELD

The present disclosure relates generally to coverings for architectural openings, and more specifically, to retractable coverings for architectural openings.

BACKGROUND

Coverings for architectural openings, such as windows, doors, archways, and the like have assumed numerous forms over the years. Early forms for such coverings consisted primarily of fabric draped across the architectural opening, and in some instances, the fabric was not movable between extended and retracted positions relative to the opening. Some newer versions of coverings may include cellular shades. These shades include horizontally disposed collapsible tubes that are vertically stacked and secured on top of one another to form a panel of tubes. The cellular tubes may trap air to help provide insulation. The stacked configuration provides insulation but can be difficult to manufacture, as rows of cells must be created that are aligned with one another.

Many cellular shades are retracted and extended by lifting or lowering, respectively, the lowermost cell. As the lowermost cell is lifted it compresses against the other cells, collapsing them on top of one another; and, as the lowermost cell is lowered, lowermost cell pulls the cells open. When in a retracted position, typical cellular shades are stored in a stacked configuration, i.e., one cell on top of the other cells in a vertical line. This retracted configuration is required for some cellular shades as wrapping the cells around a head rail may damage the cells and prevent the cells from opening.

Additionally, most cellular shades do not provide for varying light transmission therethrough. Rather, typically a cellular shade has to be retracted or extended in order to vary the light transmission through the covering. However, in some instances, it may be desirable to vary the light, without retracting the panel, e.g., a covering for a bedroom window.

SUMMARY

Examples of embodiments described herein may take the form of a covering for an architectural opening. The covering may include a head rail, an end rail and a panel spanning between the head rail and the end rail. The panel may include a front sheet, a rear sheet operably coupled to the front sheet, and a cell spanning between the front sheet and the rear sheet. When the first sheet is at a first position relative to the rear sheet the cell is open and when the first sheet is at a second position relative to the rear sheet the cell is closed.

DETAILED DESCRIPTION

Overview

Some embodiments described herein may take the form of a covering for an architectural opening including operable vanes that also form insulative cells. The covering may include a front sheet and a rear sheet. One or more cells span between the two sheets, connecting the two sheets together. The covering may be retracted and extended to cover an architectural opening. This may allow the panel, including the cells, to be wound around a roller, reducing a retracted height of the covering. Further, the cells may be opened and closed, and depending on the material(s) used in the covering, opening and closing of the cells may vary the light transmissivity of the covering.

When the cells are closed, each cell may be substantially compressed and the material forming each cell may be substantially parallel with each of the sheets. In some embodiments, a length or body of each of the cells may be adjacent to each other or partially overlap so that the cells may form a pseudo middle sheet positioned between the front and rear sheets. When the cells are open to at least some extent, each cell may be at least partially perpendicular or angled with respect to at least one of the sheets. In an open configuration, the cells may then provide insulation by trapping air in each cell, as well as between adjacent sets of cells. Further, the cells may reduce or diffuse shadows created by the structure of the covering on one side from being as noticeable on the other side of the covering. In other words, shadow lines due to light encountering the shade on the outer side thereof, whether or not at a particular angle of incidence, may be reduced as viewed from the interior side of the covering.

The Covering and Cell Operation in General

Figure 1A:
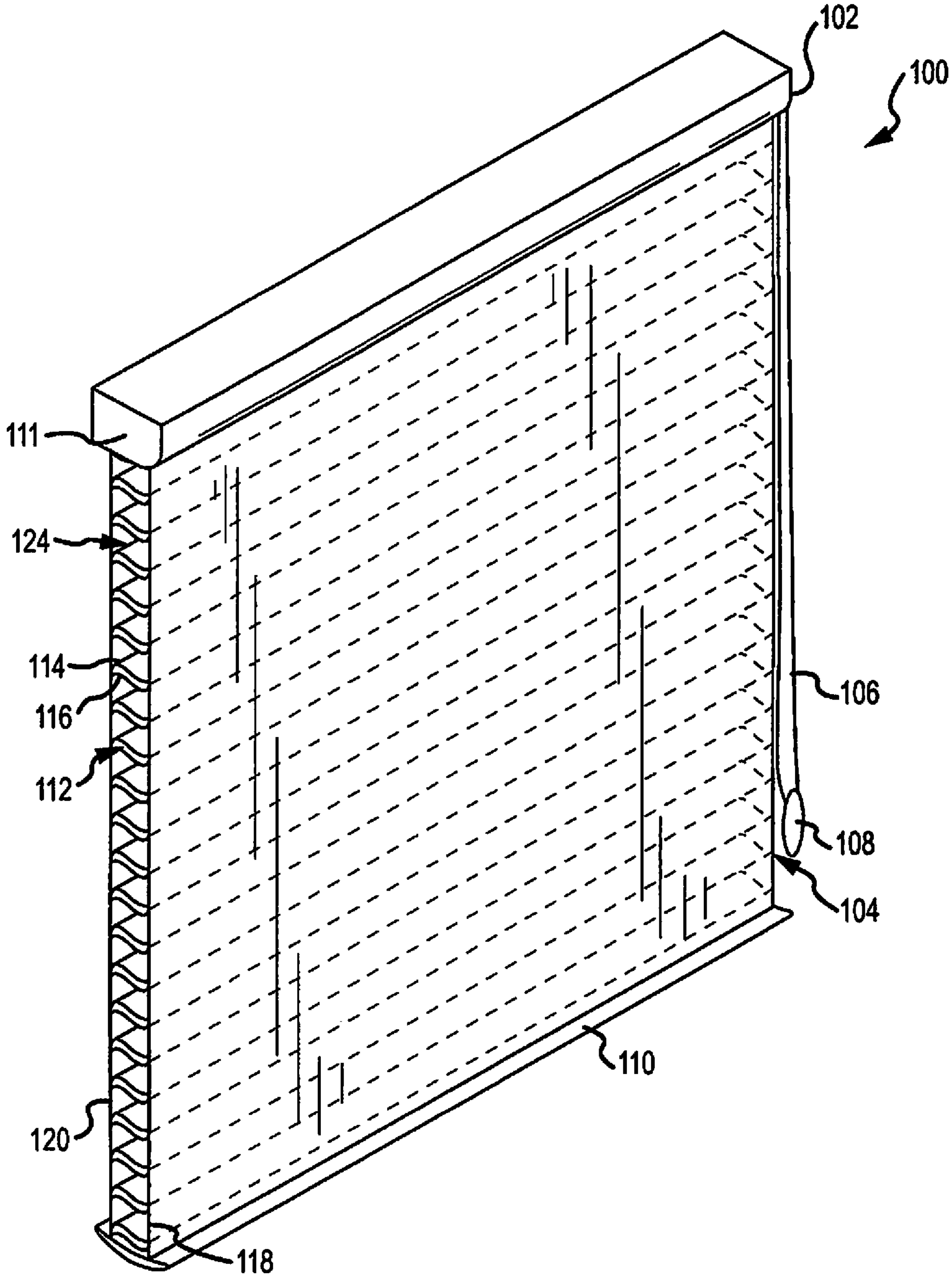
FIG. 1A is a perspective view of a covering for an architectural opening in the extended position with the cells in an open configuration.
Figure 1B:
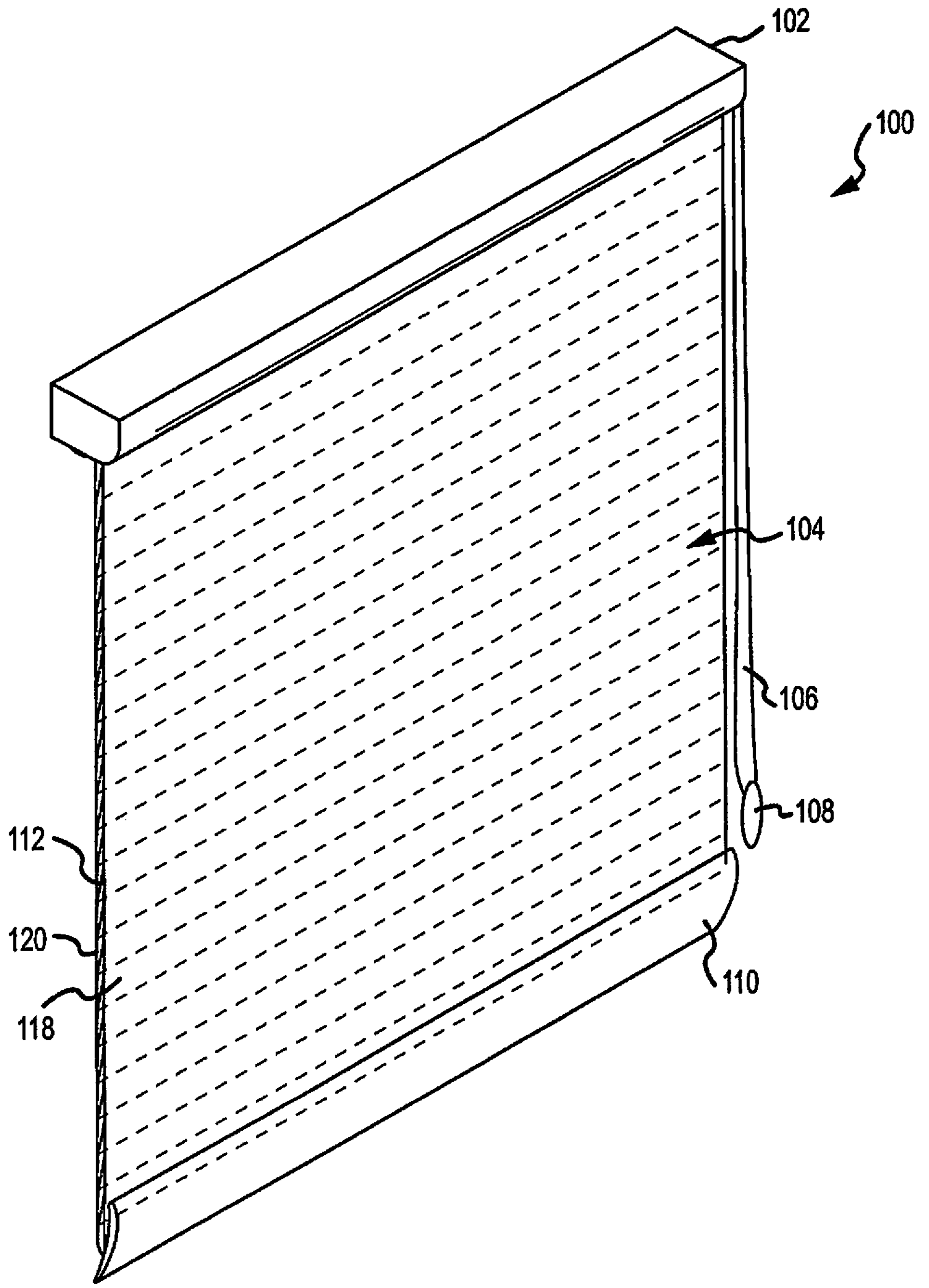
FIG. 1B is a perspective view of the covering in the extended position with the cells in a closed configuration.
Figure 1C:
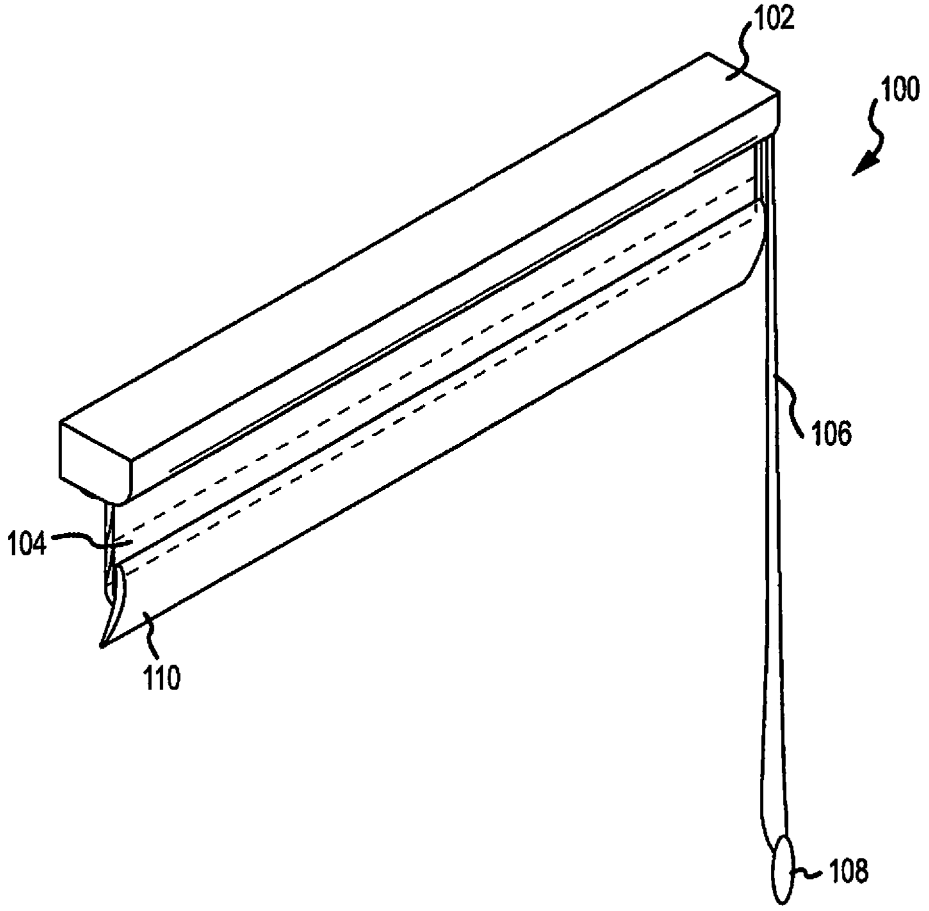
FIG. 1C is a perspective view of the covering in a retracted position.

The covering as disclosed herein may be used to cover substantially any type of architectural opening, such as but not limited to, windows, door frames, archways, and the like. Referring generally to FIGS. 1A-1C, the covering 100 may include a head rail 102, having a head tube or roller 126 (see FIG. 2A) supporting a top edge of a panel 104, and an end rail 110 supported by a bottom edge of the panel 104. For example, the front sheet 118 may be connected at connection point 103 to the roller and at connection point 105 to the end rail and the rear sheet 120 may be connected at connection point 107 to the roller and at connection point 109 to the end rail. The head rail 102 may support the panel 104 over an architectural opening and thus may generally correspond to the shape and dimensions of the architectural opening. FIG. 1A is a perspective view of the panel 104 of the covering 100 extended with the cells in an open configuration. FIG. 1B is a perspective view of the panel 104 of the covering 100 extended with the cells in a closed configuration. FIG. 1C is a perspective view of the panel 104 of the covering 100 substantially retracted into the headrail 102.

The covering 100 may also include a system for controlling the retraction, extension, and vane orientation when extended. The system may include in one example a control cord 106 and cord end pendant 108 for opening and closing cells 112 of the panel 104, as well as retracting and extending the panel 104 across the architectural opening. As is known, the system may also include a pulley about which the cord extends, the rotation of the pulley driving the rotation of the head tube. The pulley may be in a direct drive arrangement with the head tube, or may be connected through a gear train and/or clutch mechanism. In one example, the cord end 108 may provide weight to the control cord 106, in order to maintain the shape of the control cord 106. The cord end 108 may also take up additional material of the control cord 106 as the panel 104 is extend or retracted, so that the control cord 106 may remain at substantially the same length when the panel 104 is retracted or extended. Additionally, the system for controlling the rotation of the head tube may include an electric motor which is controlled manually by a user, or through pre-programmed or programmable software control unit.

It should be noted that the control cord 106 and/or cord wand 108 may be operably associated with the panel 104 and may be substantially any type of controlling mechanism, e.g., endless loop cord, single cord, rotating wand, and so on. In many embodiments, the control cord 106 and/or the wand 108 are configured to move the panel 104 so as to open and close the cells 112 and move the end rail 110 upward and downward.

The panel 104 may include a front sheet 118, a rear sheet 120, and cells 112 that span between the two sheets 118, 120. The cells 112 in the panel 104 are at least in part defined by a top vane 114 and a bottom vane 116. The top vane 114 and the bottom vane 116 may be interconnected together, and may each be connected to a front sheet 118 and a rear sheet 120. The interconnection between vanes 114, 116 and the front and rear sheets 118, 120 is discussed in more detail below with respect to FIG. 3. Each cell then includes at least in part a set of coordinated vanes that move along with movement of either or both the front and rear sheets.

The front sheet 118, the rear sheet 120, and the vanes 114, 116 may be substantially any type of material, such as but not limited to, knits, wovens, non-wovens, and so on. Additionally, the sheets 118, 120 and the vanes 114, 116 may have varying translucent properties, varying from blackout, opaque, to partially opaque, or clear. In some instances the sheets 118, 120 may have an increased light translucence as compared with the vanes, so that when the vanes 114, 116 are closed the light translucence of the covering may be varied.

Figure 2A:
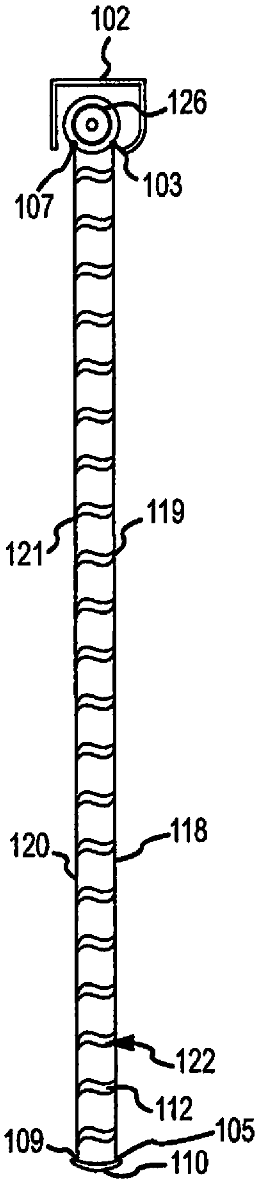
FIG. 2A is a side elevation view of the covering of FIG. 1A with an end cap removed from the head rail.

To open and close the cells 112, the sheets 118, 120 are displaced relative to one another in a direction orthogonal to the length of the vane (i.e. vertically relative to FIG. 1A), the interior volume or cavity 122 of the cell changes. In other words, the sheets may be moved by a force that may be generally parallel to each of the sheets, such as an upward vertical force provided as the roller changes position. For clarity herein, as described, the interior volume, or cavity, of the cell is represented by the cross-sectional area of the interior of the cell. For instance, when the covering is in the fully extended configuration, such as in FIG. 1A, the cell defines a larger interior volume. As sheets 118, 120 are moved relative to one another, the connected portions of each vane 114, 116 with the respective sheet are moved, and the internal volume of the cell decreases. As the sheets 118, 120 are moved further relative to each other, the internal volume is reduced to a minimal size (See FIG. 1B), at which point the cell is considered "collapsed" or closed, and the panel is prepared for retraction into the head rail (See FIG. 1C). FIG. 2A is an elevation view of the covering of FIG. 1A with the end cap removed to illustrate the roller, with the cells 112 in the open position. In these instances, although the motion of the sheets may be substantially parallel to one another (due to the force applied upwards by the roller), as the cells 112 collapse, the sheets 118, 120 may be moved horizontally closer together (See FIGS. 5A-5C). When the cells 112 are in an open configuration, the vanes 114, 116 may be spaced apart from one another to define a cavity 122 therebetween. In this position, the vanes 114, 116 may extend so that portion of each vane 114, 116 may be at least partially perpendicular or angled to the front sheet 118 and the back sheet 120. In this configuration, the cell volume is relatively large.

When the cells 112 are in the open configuration, the vanes 114, 116 may be spaced apart from the other group, or sets, of vanes 114, 116 to define gaps 124 between each cell 112. These gaps 124 may allow light to be transmitted uninterrupted through the gaps from the rear sheet 120 to the front sheet 118, especially in embodiments where the front sheet 118 and rear sheet 120 are both translucent.

Figure 2B:
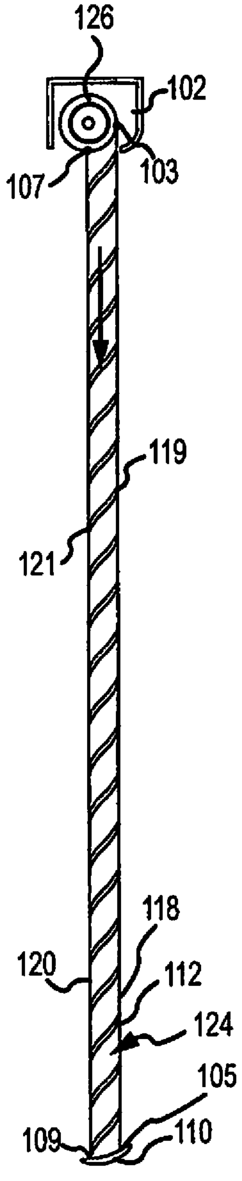
FIG. 2B is a side elevation view of the covering of FIG. 1A as the cells transition from open to closed.

FIG. 2B is a side elevation of the covering of FIG. 1B with the end cap removed to illustrate the roller. In FIG. 2B the cells 112 are in an intermediate configuration between being fully open and fully closed, such as when transitioning from an open position to a closed position. In the example illustrated in FIG. 2B, the panel 104 may be oriented to extend from a front side of the roller 126 and thus may wind around a front side of the roller. As the front sheet 118 and/or rear sheet 120 is vertically displaced with respect to the other sheet, the interior volume of the cells 112 decrease in size, as shown in FIG. 2B. In this configuration, the height gap 124 is reduced since the bottom edge 115 of an upper cell 117 is brought closer to a top edge of the adjacent lower cell. This is described in more detail below.

Figure 2C:
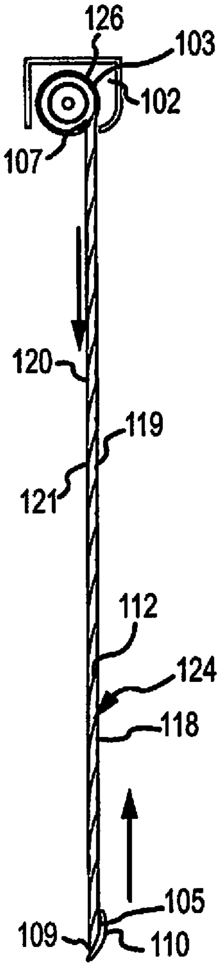
FIG. 2C is a side elevation view of the covering of FIG. 1B with the end cap removed.

FIG. 2C is a side elevation view of the covering of FIG. 1B with the end cap removed to illustrate the position of the roller. When the rear sheet 120 or the front sheet 118 continues to be displaced with respect to the other, the cells 112 will continue to collapse until the interior volume 122 between the vanes 114, 116 in each cell is in its smallest configuration. In this configuration, the vanes 114, 116 of each cell 112 may be substantially parallel to the front sheet 118 and the rear sheet 120. When cells 112 are in this closed configuration, the cavity 122 defined by the top vane 114 and the bottom vane 116 may be substantially eliminated.

When the cells 112 are closed, the gaps 124 may also be reduced and/or eliminated. This occurs because the open distance, Gopen (defined below with respect to FIG. 3) between a lower edge 119 of an adjacent upper cell and the upper edge 121 of a lower cell is eliminated, with the two edges 119, 121 possibly overlapping. Thus, the cells 112 may form a pseudo multi-layer middle sheet positioned between the front and rear sheets 118, 120. Depending on the transmissivity of the vane materials, in the closed configuration the vanes 114, 116 may block light at least partially or substantially from being transmitted through the rear sheet 120 to the front sheet 118. A more detailed description of the movement of the vanes 114, 116 and configuration of the cells 112 while the panel 104 is retracted or extended is discussed below with respect to FIGS. 5A-5C.

Referring briefly to FIGS. 1C and 2C, when the covering 100 is retracted, the panel 104 may be wrapped around a roller 126. As the roller 126 rotates in a particular direction, the panel 104 is wound around the outer surface of the roller 126. To retract the panel 104, the roller 126 may wind in the opposite direction, unwrapping the panel 104.

To open or close the cells 112, the roller 126 may turn a partial rotation, e.g., a quarter turn in order to sufficiently vertically displace the one of the sheets 118, 120 with respect to the other. For example, the two sheets 118, 120 may be connected to the roller 126 and be spaced apart from one another, so as the roller 126 rotates, the sheets 118, 120 may be displaced with respect to each other because a height of one sheet 118, 120 may be varied with respect to the other sheet 118, 120 as the roller 126 is rotated. As can be seen in FIGS. 2A-2C, as the roller rotates, the connection points 103, 107 of the front sheet and rear sheet to the roller may change in position relative to one another. In FIG. 2A the connection points 103, 107 may both be positioned at a bottom edge of the roller which is exposed through the headrail. In FIG. 2B the connection points 103, 107 may be partially offset from one another, with the front sheet 118 connection point 103 being located on a portion of the roller received within the head rail and the rear sheet 120 connection point 107 being positioned on the portion of the roller exposed in an aperture of the headrail. And, in FIG. 2C the front sheet connection point 103 may located further within the headrail, and the rear sheet connection point 107 may be closer towards a right side (relative to FIG. 2C) of the headrail.

The front sheet 118 and the rear sheet 120 may function as the operating elements to open and close the cells 112. Thus, the manufacturing process for the covering 100 may be simpler than conventional coverings including operable vanes. For example, in creating the panel 104, the vanes 114, 116 may be attached to the sheets 118, 120 without requiring placement of operating elements between the vanes 114, 116 and the sheets 118, 120.

It should be noted that the front sheet 118 and the rear sheet 120 may be displaced relative to each other in many other manners, and the aforementioned embodiments are meant as exemplary only. Similarly, the panel 104 may be retracted and extending in substantially any manner.

The Cell Structure in Detail

Figure 3:
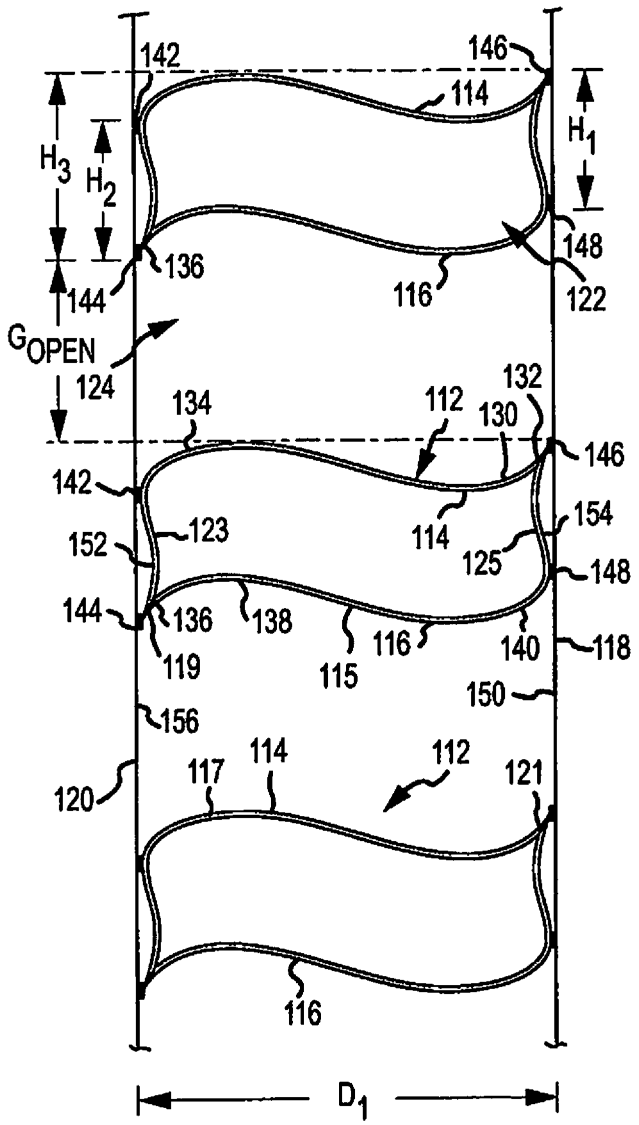
FIG. 3 is an enlarged side elevation view of a cellular panel of the covering of FIG. 1A.

As briefly described above, the cells 112 for the covering 100 are formed at least in part by a set of two vanes, such as an upper, or top, vane 114 and a lower, or bottom, vane 116. FIG. 3 is an enlarged side elevation view of the covering 100 of FIG. 1A. Each cell 112 is a tube having sidewalls 123, 125 that define a cavity 122, the cell 112 extending across the width of the covering 100. Each cell 112 is generally parallel to the cell adjacent above it and adjacent below it. Each cell 112 may be constructed of one piece of material integrally formed to define the sidewalls 123, 125 of a tube, separate strips, such as vanes 114, 116, attached together to define sidewalls 123, 125 of a tube, separate strips or vanes attached to the front and/or back sheets 118, 120 which together define sidewalls 123, 125 of a tube, or one piece of material attached to the front or back sheet which together define sidewalls of a tube.

FIG. 3 shows an example of a panel construction where the cell 112 is positioned between a front sheet 118 and a rear sheet 120. The cell 112 defines an enclosed tube without requiring any portion of the front or rear sheets. Thus the cell 112 may be constructed by one integral sheet of material formed into a tube, or two or more separate vanes attached together to form a tube. The cell 112 in this example is two vanes 114, 116 attached together, and defines two opposing apexes 132, 136, one adjacent the front sheet 118, and one adjacent the rear sheet 120. With continued reference to FIG. 3, the top vane 114 spans between the front sheet 118 and the rear sheet 120. As the top vane 114 approaches the front sheet 118, it may extend substantially parallel to a back surface of the front sheet 118. The top vane 114 may have a crease 132 beak, apex, or tip at the top of the parallel portion to the front sheet 118. The top vane 114 may extend downward from the crease 132 and may be operably connected the front sheet 118 at a first front connection member 146. The first connection member 146 may be located either coextensively with the crease 132 or at a position below or above the crease 132.

After the location of the first connection member 146, the top vane 114 extends downward to form a sidewall 154 that may be partially or substantially parallel to the front sheet 118. The sidewall 154 bends outwards towards the rear sheet 120 and is connected via a second front connection member 148 to the rear face 150 of the front sheet 118. The second front connection member 148 may be aligned with a bottom curve or bend point of the bottom vane 116. In one example, the sidewall 154 may have a slight curve such as an “S” shape as it transitions from the location of the first front connection member 146 to the location of the second front connection member 148. Further, as shown in FIG. 3, the top vane 114 sidewall 154 transitions to form the bottom vane 116 at or after the location of the second front connection member 148.

As the top and bottom vanes 114, 116 in this example are formed from a single piece of material, the bottom vane 116 may be connected at the location of the second front member 148 and may curve outward and transition away from the front sheet 118 at the bend point 140. The bottom vane 116 extends horizontally from the front sheet 118 to connect to the rear sheet 120. As the bottom vane 116 approaches the rear sheet 120, it curves upward towards the head rail 102 at bend point 138, in an opposite direction from the bend point 140. In one example, the bottom vane 116 may have two bends or curves 138, 140 that are curved in opposite directions. In other words, the first bend point 140 extends the bottom vane 116 downward towards the end rail 110 and the second bend point 138 extends the bottom vane 116 upward towards the head rail 102. In this manner, the bottom vane 116 may be shaped as an "S" or other curved shape.

At the bottom portion of the second bend point 138, the bottom vane 116 transitions into the bottom crease 136, or point. The bottom crease 136 may be directed towards the end rail 110, and may be oppositely positioned with respect to the crease 132 of the top vane 114. Similar to the crease 132 of the top vane 114, the bottom vane 116 may be connected to the rear sheet 120 (via a second rear connection member 144) adjacent to or coextensive with the crease 136.

With continued reference to FIG. 3, the bottom vane 116 transitions upwards from the crease 136, forming a rear sidewall 152. The rear sidewall 152 may be substantially parallel to the rear sheet 120 and may have a corresponding shape to the front sidewall 154. The rear sidewall 152 is operably connected to the inner surface 156 of the rear sheet 120 via a first rear connection member 142. The first rear connection member 142 may be located near a transition between the bottom vane 116 and the top vane 114.

After the location of the first rear connection member 142, the bottom vane 116 curves at bend point 134, transitioning into the top vane 114. The top vane 114 extends between the two sheets 118, 120 and curves at a second bend point 130 to transition to the crease 132.

Figure 5A:
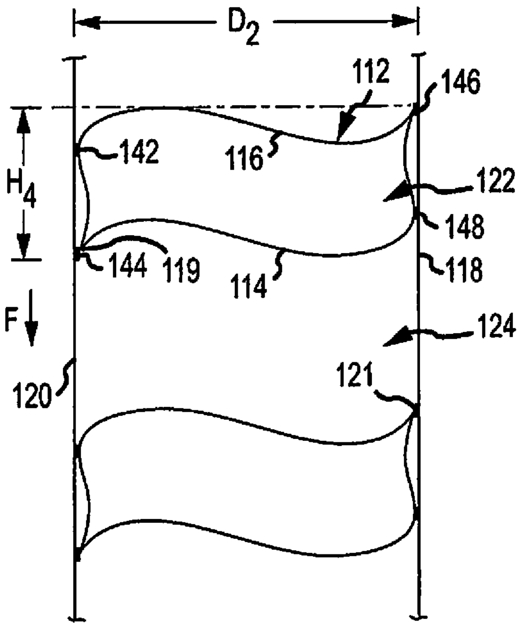
FIG. 5A is an enlarged side-elevation view of the cellular panel in FIG. 2A.

It should be noted that the top vane 114 and the bottom vane 116 may be complementarily shaped, and the two vanes 114, 116 may generally trace the overall shape of each other. In this manner the bend or inflection points of each vane 114, 116 may be aligned and curved in the same direction. This complementary structure may allow the top vane 114 and the bottom vane 116 to be compressed into each other, e.g., when the cells 112 are closed as shown in FIG. 5C. In one example the vanes may be 114, 116 heat set and folded, which may determine the open shape of the cell 112. For example, the vanes 114, 116 may extend away from the attachment locations to the sheets 118, 120 at large or narrow departure angles, depending on whether the vanes 114, 116 include creases are heat set and folded or just attachment points without a separate heat set or otherwise permanent or semi-permanent crease formed therein. Furthermore, the vanes 114, 116 may include fabric stiffeners to provide for a desired cell 112 shape substantially without sag in the open configuration. In other examples, the vanes 114, 116 may include fibers, or may be an at least partially rigid material that may maintain its shape or may be at least partially resilient so that it may return to its original shape after deformation.

The connection members 142, 144, 146, 148 operably couple the vanes 114, 116 to the sheets 118, 120 so that as the sheets 118, 120 move the vanes 114, 116 may move correspondingly. The connection members 142, 144, 146, 148 may be substantially any type of connecting component, such as but not limited to, adhesive, fasteners, sewing, hook and loop, and so on. In some examples, the connection members 142, 144, 146, 148 may extend across the entire width of the respective front sheet 118 or rear sheet 120. In this manner, the vanes 114, 116 may be operably connected to the sheets 118, 120 substantially along their entire width.

The connection members 142, 144, 146, 148 may be spaced apart from each other at varying distances. The distance each connection member 142, 144, 146, 148 is spaced apart may determine the opening and closing characteristics of the cells 112, as well as the shape of the cells 112. For example, the spacing may determine the size of the cavity of the cells, as well as the size of the gaps defined between each of the cells.

As shown in FIG. 3, in one example, the first front connection member 146 and the second front connection member 148 may be positioned on the back surface 150 of the front sheet 118 at a height of H1 from each other. Similarly, the first rear connection member 142 and the second rear connection member 144 may be spaced apart from each other on the back sheet 120 by a height of H2 from each other. The heights H1 and H2 may be substantially the same so that the vanes 114, 116 in the open position may span substantially horizontally between the two sheets 118, 120 or the heights H1 and H2 may be different and the vanes 114, 116 may be angled in spanning between the front sheet 119 and the rear sheet 120.

The heights H1 and H2 may be varied depending on the desired volume of the cavity 122 of the cell 112 and/or the height of the cells 112. Further, in some embodiments, the top vane 114 and/or the bottom vane 116 may be interconnected to a respective sheet 118, 120 along the entire heights H1 and H2. In other words the first and second connection members may be combined forming a single connection member. However, in these embodiments, the cell 112 may be more rigid than in embodiments with two separate connection locations.

Additionally, when the cells 112 are open, the first front connection member 146 may be spaced apart from the second rear connection member 144 by a height of H3. The height H3 varies as the cells 112 are opened and closed. This transition and height variation will be discussed in more detail below with respect to FIGS. 5A-5C.

The interconnection of the vanes 114, 116 and the connection of the vanes 114, 116 to the sheets 118, 120 forms the cells 112 for the panel 104. The cell 112 structure of the vanes 114, 116 provides insulation from a first side of the covering 100 to a second side of the covering 100. The cells 112 trap pockets of air in the cavities 122, which acts as a buffer to provide insulation. Thus, a temperature of an environment on the rear side of the panel 104 may not affect the temperature of an environment on the front side of the panel 104. For example, with a window as the architectural opening, the cells 122 may trap air preventing cold air from a first side of the window that may be exposed to outside elements from decreasing the temperature of air on the front side of the window.

Additionally, the cells 112 may be positioned apart from each other by a gap 124. The gaps 124 formed between cells 112 may also act to trap air and provide further insulative properties to the covering 100. When the cells 112 are fully open, the gaps 124 may have a height Gopen (e.g., when the panel is in the open configuration shown in FIG. 2A). The height Gopen may be defined as the height between the bottom apex or crease 136 or lowermost point of an upper cell and the upper apex of crease 132 of an adjacent lower cell or the upper most point of the lower cell. The height Gopen may define the height of light rays which may be transmitted through the front sheet 118 and rear sheet 120 between the cells 112. Accordingly, as the height Gopen between the cells changes, so does the amount of light rays which can be transmitted through the covering 100 without encountering the material of the cells, i.e., pass only through the front sheet 118 and rear sheet 120.

The insulative characteristics of the covering 100, in addition to the operable nature of the vanes 114, 116 for varying light transmission, provide multiple features from a single covering. When the cells 112 are open, the vanes 114, 116 are spaced apart from each to define a cavity 122 therebetween, see, e.g., FIG. 3. Also, each cell 112 defined by the vanes 114, 116 is spaced apart from adjacent cells 112, defining gaps 124 between each row of cells 112. When the cells 112 are closed, the vanes 114, 116 may be adjacent one another or may be in contact with at portion of the other vane 114, 116. In this manner, the cavity 122 may be substantially reduced, as well as the gaps 124 between the cells 112, in some instances the height Gopen may be completely reduced so that there may be very little (if any) distance between the bottom apex 136 or lowermost point of an upper cell and the upper apex 132 or uppermost point of an adjacent lower cell, see for example, FIG. 5C.

The vanes 114, 116 may be strips of an at least partially flexible material interconnected to the sheets 118, 120 horizontally along a width of the panel 104. The vanes 114, 116 may be flexible yet rigid. For example, the vanes 114, 116 should be flexible enough so that they may be compressed to a substantially flat position without being damaged, e.g., see FIG. 2C; yet, be rigid enough so that they may maintain their shape when the cells 112 are open, see, e.g., FIG. 2A.

Figure 4A:
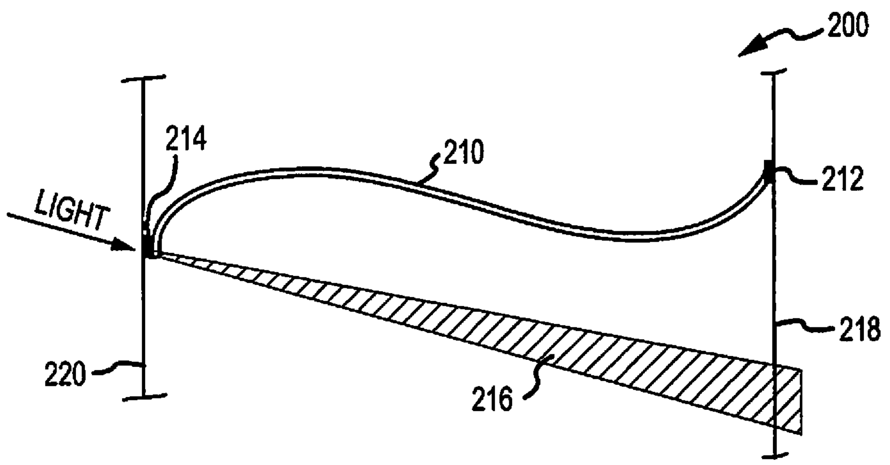
FIG. 4A is a side elevation view of a covering having a single vane with shadows being transmitted therethrough.

Furthermore, the cell 112 structure of the vanes 114, 116 also diffuses shadows formed from light transmitted through the covering at a non-perpendicular angle thereto. In this manner, the shadows may be substantially prevented from being transmitted through the panel 104. This may be especially apparent in examples where the front sheet 118 and the rear sheet 120 are a sheer or otherwise have a high light transmissivity. FIG. 4A is a side elevation view of a covering 200 including only a single vane 210. The vane 210 is connected to the front sheet 218 at via a first adhesive 212 and to the rear sheet 120 via a second adhesive 214. The adhesive 212, 214 secures the vane 210 to the two sheets 218, 220.

With continued reference to FIG. 4A, as light encounters the rear sheet 220 (e.g., if the covering is positioned over a window), the light may be transmitted through the rear sheet 120 and the adhesive 214 blocks part of the light; however, other light rays may pass through the rear sheet 220 without be blocked. Thus, the light blocked by the adhesive 214 may form a shadow 216. As the vane 210 is positioned above the shadow 216, the shadow 216 may be transmitted to the front sheet 218 and may be visible on the front side of the covering.

The shadow 216 may appear black or and darkened portions or spots of the front side of the covering 200, which may be aesthetically unpleasing. Additionally, the spots may cause the material of the front sheet 218 to fade unevenly due to light exposure.

Figure 4B:
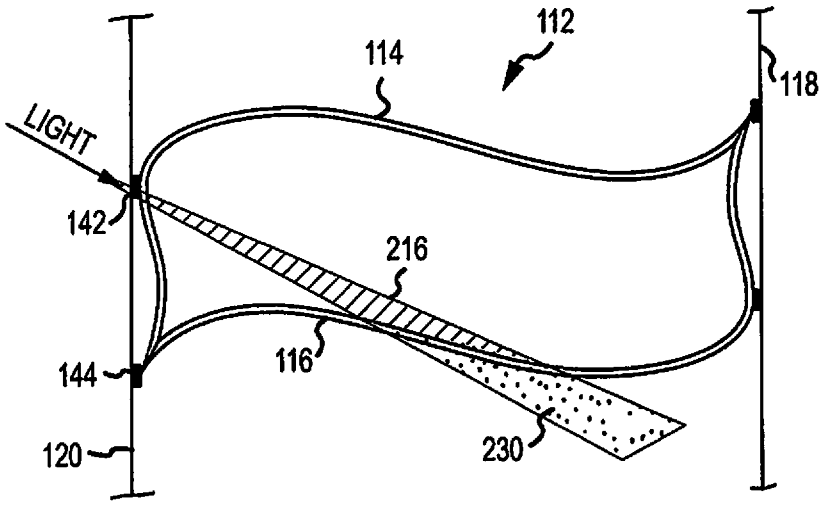
FIG. 4B is a side elevation view of the covering of FIG. 1A illustrating shadows being diffused through the cell structure of one example of the present invention.

In contrast, the covering 100 of the present disclosure may eliminate darkened spots due to shadows. FIG. 4B is an enlarged side elevation view of the covering 100 being exposed to light. Although a shadow 216 may be created as light is blocked by the first rear connection member 142, which may include adhesive, the shadow 216 may be diffused by the bottom vane 116. The bottom vane 116 may substantially reduce the appearance of the shadow 216 and may therefore create a diffused shadow 230. The diffused shadow 230 may not reach the front sheet 118, thus preventing darkened spots or portions to appear on the front sheet 118. In instances where the shadow may reach the front sheet 118, the shadow may be so attenuated that it may not create a darkened spot on the front side of the covering 100. Hence, the covering 100 may have substantially even fading, as compared with the covering 200 of FIG. 4A, as well as may be more aesthetically appealing.

Opening and Closing the Cells

The operations of opening and closing the cells 112 will now be discussed. The cells 112 may be opened and closed by varying a spacing distance D1 between the front sheet 118 and the rear sheet 120, as well changing the relative heights or orientation of the sheets 118, 120 with respect to each other. For example, as shown in FIG. 3, when the cells 112 are completely open the sheets 118, 120 may be spaced apart from each other by a distance D1. The distance D1 may correspond to a horizontal width of the vanes 114, 116 that spans between the two sheets 118, 120.

As briefly describe with respect to FIGS. 2A-2C, movement of the sheets 118, 120 relative to each other may be accomplished by the control cord 106 and the head rail 102 and/or end rail 110. The sheets 118, 120 may move vertically generally parallel with respect to the second sheet, which may be accomplished in substantially any manner. The opening and closing of the cells 112 will be described herein as moving the front sheet 118 with respect to the rear sheet 120. However, it should be noted that other embodiments are possible. Specifically, the rear sheet may be moved as well or instead of moving the front sheet, see, for example, FIGS. 12A-12C. Accordingly, the foregoing discussion is meant as exemplary only.

As shown in FIG. 3, when the cells 112 are in the fully open position, the first front connection member 146 and the second front connection member 144 may be separated by a vertical height (with respect to the length of the covering 100) of a height H3. FIG. 5A is a side elevation view of the cells 112 in a mostly open configuration as the cells 112 transition from open to closed. As the rear sheet 120 experiences a force downward, the front sheet 118 may remain substantially in its original position. Thus, the vanes 114, 116 are pulled downwards with the rear sheet 120, pulling the sheets 118, 120 closer to each other because the vanes 114, 116 are connected to each sheet 118, 120. For example, the distance D2 that separates the sheets 118, 120 when the cells 112 are mostly open is less than the distance D1 separating the sheets 118, 120 when the cells 112 are fully open. Although the force downward may be applied generally parallel to the two sheets, as the sheets shift vertically relative to one another, the vanes provide a horizontal force pulling the sheets closer together. This horizontal force is due to the vertical shifting of the connection points of the vanes, discussed in more detail below.

Further, the height between the first front connection member 146 and the second rear connection member 144 is extended to a height H4. The height H4 may be larger than the height H3, as the vanes 114, 116 transition from a relatively perpendicular orientation with respect to the sheets 118, 120 to an angled orientation.

Figure 5B:
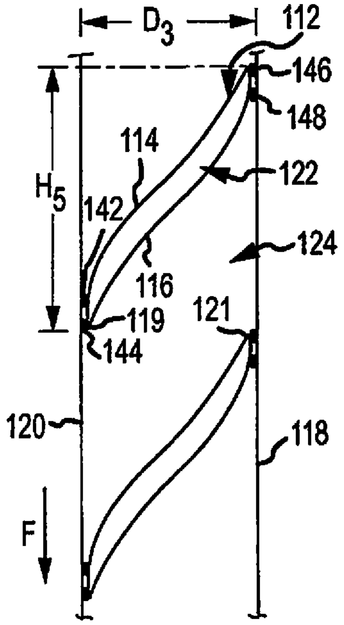
FIG. 5B is an enlarged side elevation view of the cellular panel of FIG. 2B.
Figure 5C:
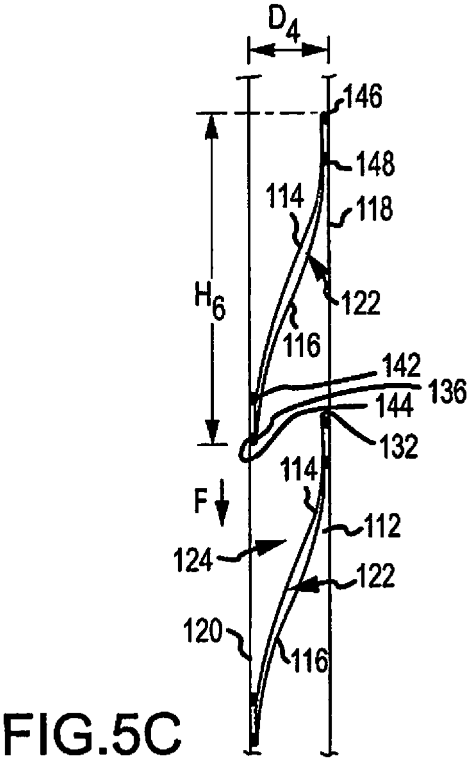
FIG. 5C is an enlarged side elevation view of the cellular panel of FIG. 2C.

FIG. 5B is a side elevation view of the cells 112 in a partially closed configuration as the cells 112 transition from open to closed. If the rear sheet 120 continues to experience a downwards force F, the distance between the sheets 118, 120 reduces to distance D3. Additionally, the height between the first front connection member 146 and the second rear connection member 144 increases to a height of H5. The vanes 114, 116 thus transition so as to be substantially parallel to the sheets 118, 120, and the cavity 122 reduces in volume as the cells 112 collapse.

As the rear sheet 120 continues to experience a downwards force F and the front sheet experiences an upward force, the cells 112 close. FIG. 5C is a side elevation view of the cells 112 in a substantially closed configuration. The sheets 118, 120 may then be positioned substantially adjacent each other and separated by a distance D4, which may be significantly less than the open distance D1. In some examples the distance D4 may be substantially zero, that is the sheets 118, 120 may be substantially in contact with each other. Additionally, the first front connection member 146 may be separated from the second rear connection member 144 by a height H6, which may be larger than the other heights separating the two connection members 144, 146. In this configuration, the vanes 114, 116 may be positioned substantially parallel to the sheets 118, 120, as shown in FIG. 5C. Further, as the vanes 114, 116 are substantially parallel with the sheets 118, 120, the cell cavities 122 may be substantially collapsed, collapsing the cells 112. In the configuration shown in FIG. 5C, the height Gopen between the lowermost apex 136 of the upper cell and the uppermost apex 132 of the adjacent lower cell may be substantially, if not completely, reduced, so that little to no light may be transmitted through the panel 104 without being transmitted through the material of the cells 112.

Once the cells 112 are closed as shown in FIG. 5C, the panel 104 may be retraced around the roller 126. The collapsed or closed configuration of the cells 112 allows the panel 104 to be rolled without damaging the shape of the vanes 114, 116 and thus the cells 112. Thus, unlike conventional cellular shades, the covering 100 provides insulation, varying light transmission, as well as a rolled storage or retracted configuration.

Alternative Cell Examples

Figure 6:
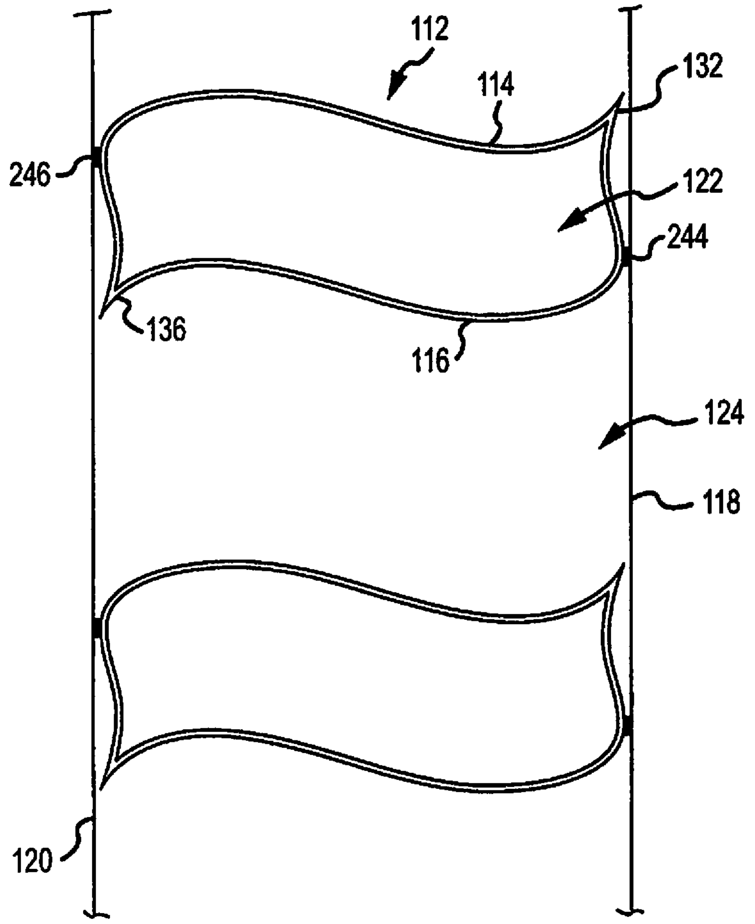
FIG. 6 is an enlarged side elevation view of a second example of a cell for the covering of FIG. 1A.

The cells 112 of the covering 100 may be formed in different shapes, and the connection members and locations between the vanes 114, 116 and the sheets 118, 120 may be altered. As discussed above, the cells 112 may be formed of two interconnected vanes, a single piece of material folded and interconnected to itself, or multiple sheets of material. In one example, the vanes 114, 116 may be connected to each sheet 118, 120 at a single location. FIG. 6 is a side elevation view of an exemplary cell 112 where the vanes 114, 116 are connected to the front sheet 118 and the rear sheet 120, respectively, by a connection member 244, 246. In this example, the creases 132, 134 forming the upper and bottom tips of the vanes 114, 116, receptively, may be free or unattached from the sheets 118, 120. In this embodiment, the creases 132, 136 may be set into the material forming the vanes 114, 116 (e.g., heat or chemically folded) so that they may be at least partially rigid to retain the bend point. In this example, the cells 112 may be substantially more flexible that in other embodiments.

Figure 7A:
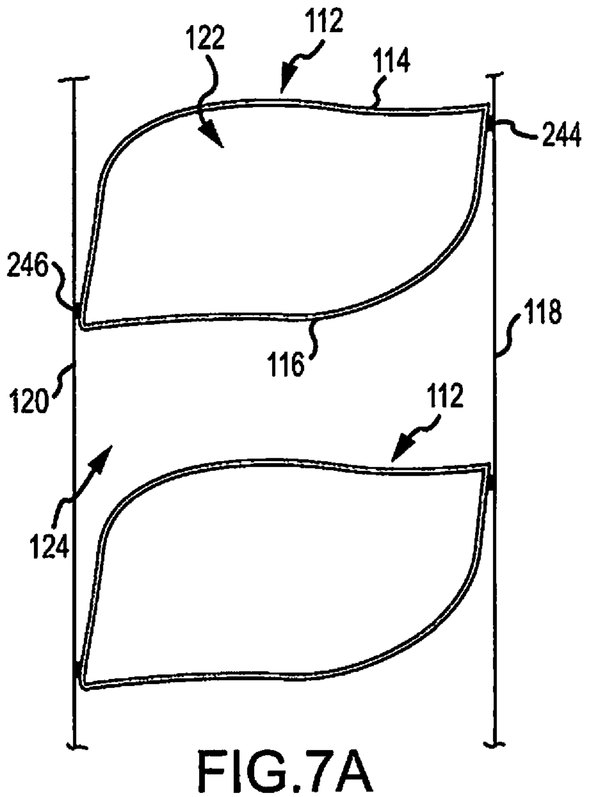
FIG. 7A is an enlarged side elevation view of a third example of a cell for the covering of FIG. 1A.
Figure 7B:
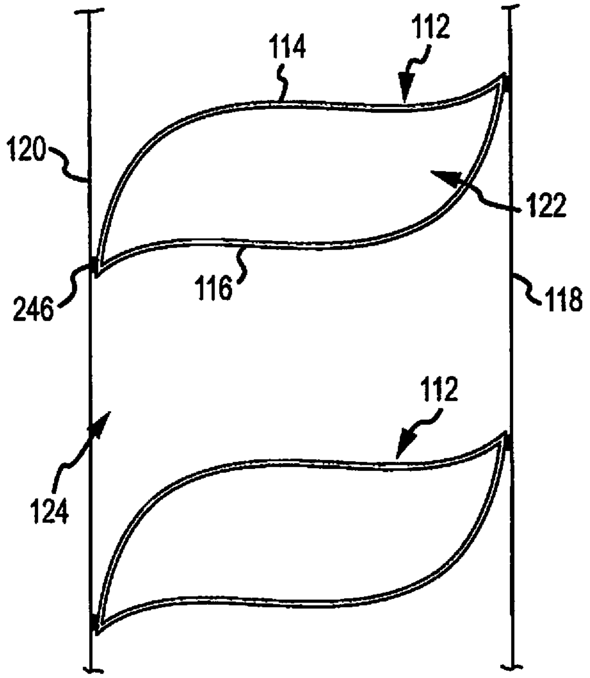
FIG. 7B is an enlarged side elevation view of a fourth example of a cell for the covering of FIG. 1A.

Additionally, the shape of the cells 112 may be differently configured. FIGS. 7A and 7B illustrate alternative cell shapes. In the cell 112 illustrated in FIG. 7A, the vanes 114, 116 may be less "S" shaped and have a more "C" shape, in other words, the curves may be less defined than the cell 112 of FIG. 3. In the FIG. 7A example the vanes 114, 116 may have an increased departure angle away from the sheets 118, 120. Also, the cavity 122 may be larger, trapping more air and providing increased insulation as compared with the cells 112 of FIG. 3. However, as the cell 112 has an increased cavity volume 122, the vanes 114, 116 may block more light that may be transmitted through the gaps 124, as the gaps 124 may be smaller.

As shown in FIG. 7B, the cell 112 may have a narrower cavity 122 formed from a small departure angle as the vanes 114, 116 transition away from connection points to the sheets 118, 120. In the FIG. 7B examples, the vanes 114, 116 may provide less insulation than the cell shape of FIG. 7A. However, in the FIG. 7B example, more light may be transmitted through the covering 100 (if clear or high transmissive materials are used for the sheets 118, 120) because the cells 112 may have a reduced height compared with the cells of FIG. 7A.

Figure 8:
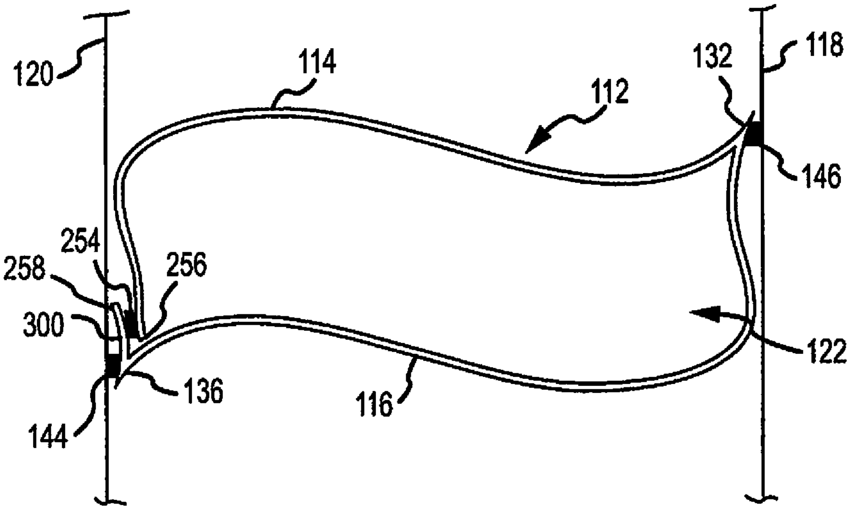
FIG. 8 is an enlarged side elevation view of a fifth example of a cell for the covering of FIG. 1A.

In some examples, the cells 112 may be created by a single piece of material or by multiple pieces of material connected together. FIG. 8 illustrates an exemplary cell 112 formed by a material overlapped on itself and connected together. The bottom vane 116 partially overlaps a terminal edge 256 of the top vane 114. Rather than being connected together, the terminal edge 256 of the top vane 114 is received within a tab 300 of the bottom vane 116. The top vane 114 is connected to the bottom vane via a connection member 54. The vane connection member 254 may be substantially similar to the connection members 142, 144, 146, 148 and the vane connection member 254 may be adhesive, hook and loop, or other fastener.

The tab 300 may be operably connected to the inner surface 156 of the rear sheet 120 by the connection member 144. A free end 258 of the tab 300 may extend past both the connection member 144 and the vane connection member 254.

Figure 9:
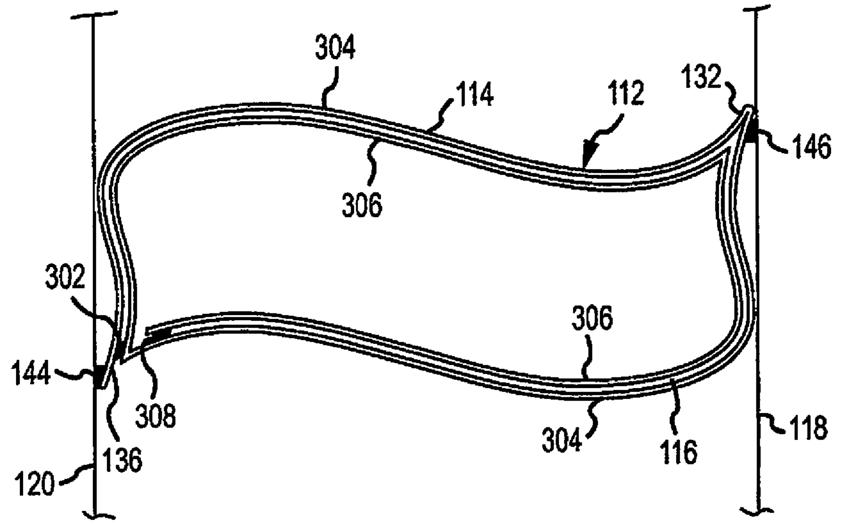
FIG. 9 is an enlarged side elevation view of a sixth example of a cell for the covering of FIG. 1A.

In another example, the cells 112 may include multiple layers. In these examples, the insulation properties of the panel 104 may be increased as air may be more securely received within the cavity 122. FIG. 9 is an enlarged view of a single cell 112 formed by overlapping material over itself and connected. In this manner, the top vane 114 and the bottom vane 116 may each have a first or outer layer 304 and a second or inner layer 306. The two layers combine to form each vane 114, 116. The material is connected together by the connection member 302. The connection member 302 location is shown as being located at the bottom crease 136; however, it may be positioned at substantially any other location.

Figure 10:
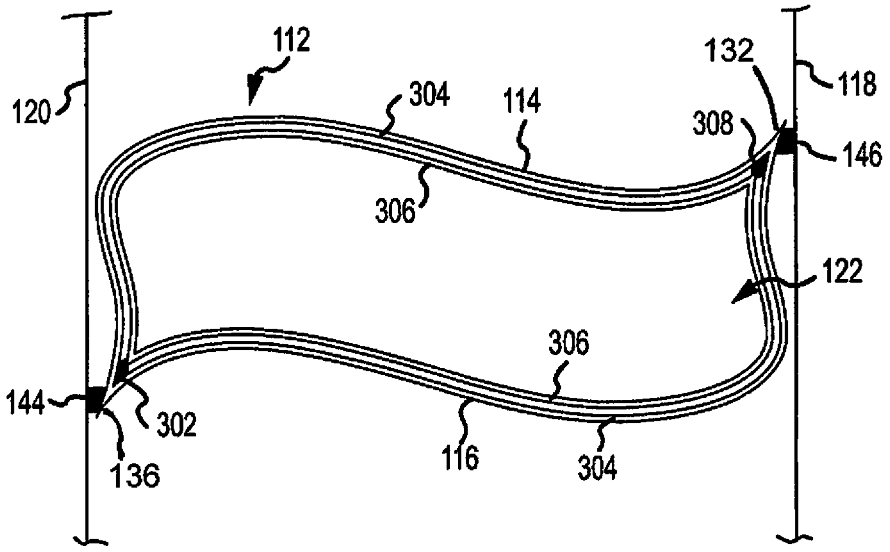
FIG. 10 is an enlarged side elevation view of a seventh example of a cell for the covering of FIG. 1A.

In other examples, the two layers 304, 306 may be formed by connecting two separate pieces of material to each other. FIG. 10 is an enlarged side elevation view of the cell 112 including the two layers 304, 306. The two layers are connected by a second connection member 308 in addition to the connection member 302 shown in the cell 112 of FIG. 9. In this example the second connection member 308 is located in the crease 132. Thus, the cell 112 may be connected together by the first connection member 302 in the crease 136 and by the second member 308 at the crease 136. It should be noted that other connection locations are possible as well, and the locations illustrated in FIGS. 9 and 10 are exemplary only.

Figure 11:
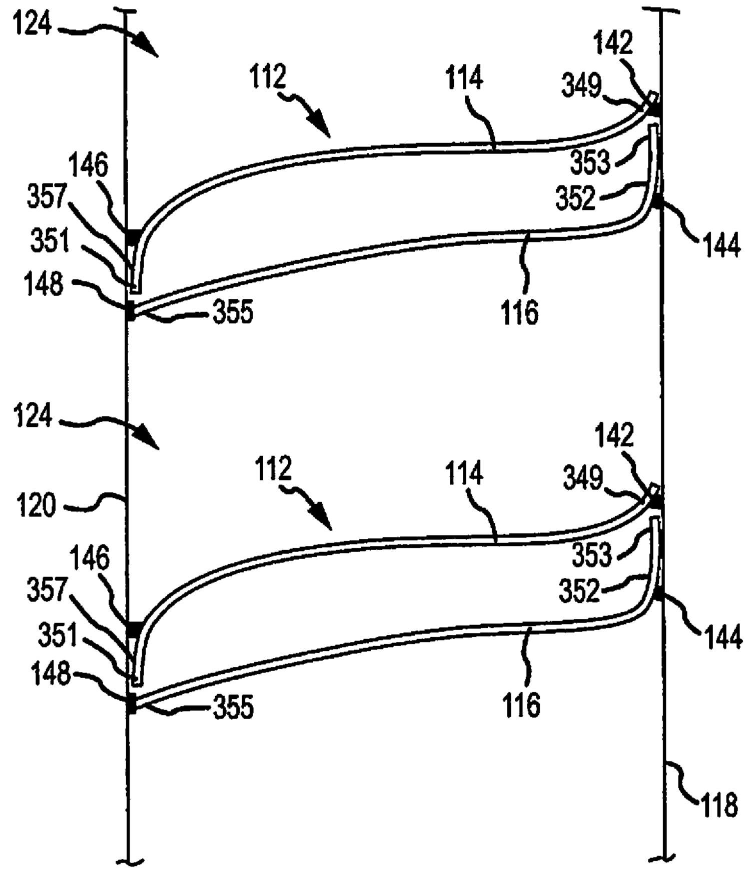
FIG. 11 is an enlarged side elevation view of an eighth example of a cell for the covering of FIG. 1A.

In yet other examples, the cells 112 may be formed from two separate pieces of material that are connected to the sheets 118, 120. FIG. 11 is an enlarged side elevation view of a cell 112 formed by two disconnected vanes 114, 116. In this example, the cell 112 may not be fully enclosed, as the vanes 114, 116 may be not directly connected together, and the sheets 118, 120 may form a portion of a front and rear wall of the cells 112. With reference to FIG. 11, the top vane 114 may have a first free end 349 operably connected to the first front connection member 142 and a second free end 351 that extend downwards past the first rear connection member 146 forming a flap 357 or tab. The flap 357 may at least partially extend downwards from the first rear connection member 146 towards the second rear connection member 146. The flap 357 may be at least partially parallel to a portion of the rear sheet 120 or may be otherwise angled to extend downwards towards the second front connection member 148.

The bottom vane 116 may be substantially similar to the top vane 114, but may positioned in an opposite manner. That is, the bottom vane 116 may include two free ends 353, 355, with the first free end 353 extending upwards from the second front connection member 144 towards the first front connection member 142. In this manner, the bottom vane 116 may include a flap 352 or tab that may form a portion of a front wall of the cell 112. The second free end 355 may be operably connected to the rear sheet at the second rear connection member 148.

With reference to FIG. 11, the two flaps 352, 357 of the vanes 114, 116 may substantially form the rear and front walls of the cell 112, as they extend substantially the entire length of the sheets 118, 120 between the first connection members 142, 146 and the second connection members 144, 148. In other words, there may be a minimal distance, if any, between the flap 357 of the top vane 114 and the second rear connection member 148 and the flap 353 of the bottom vane 116 and the first front connection member 142. The flaps 352, 357 may be at an at least partially rigid material or may include a component such as fibers or pressure sensitive adhesive that may provide additional rigidity to allow the flaps 352, 357 to support themselves and maintain a desired shape. Since the flaps 352, 357 extend towards the opposite vane 114, 116, the cell 112 may be substantially enclosed by the vanes 114, 116. However, in other instances, the flaps 352, 357 may define a gap and terminate prior to the first front connection member 142 or the second rear connection member 148, respectively. In these instances, the cell 112 may be at least partially defined by the front and rear sheets 118, 120. That is, the front and rear sheets 118, 120 may form a portion of the front and rear walls of the cells.

Light Admitting Example

Figure 12A:
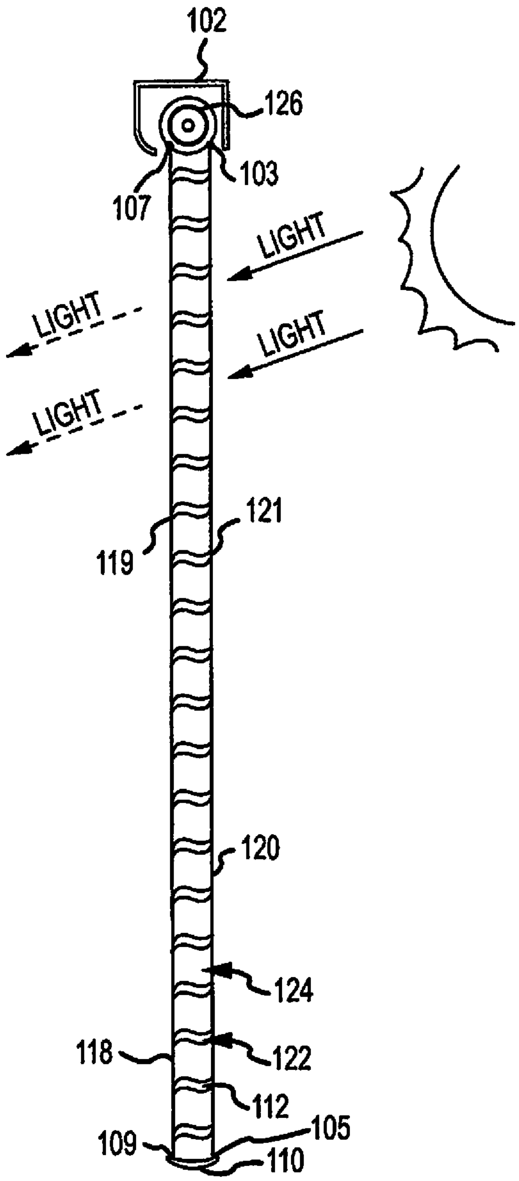
FIG. 12A is a side elevation view of another example of the covering of FIG. 1A with an end cap removed from the head rail.
Figure 12B:
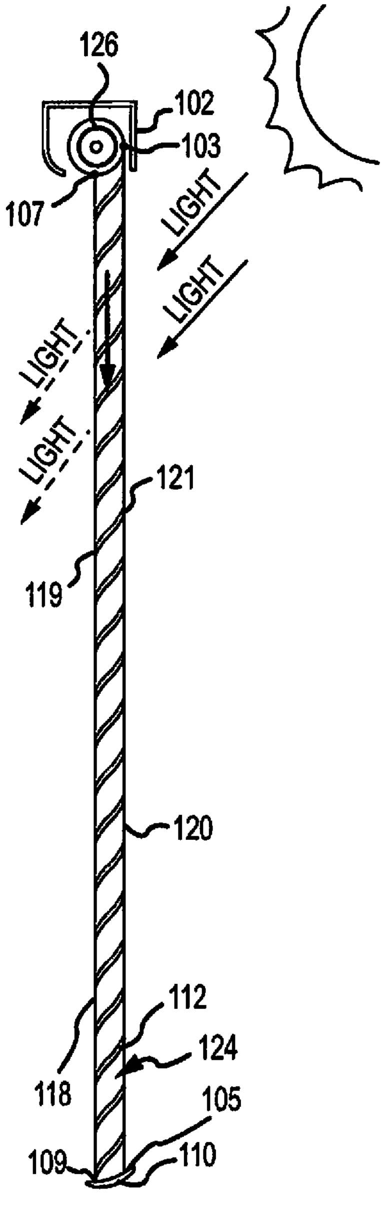
FIG. 12B is a side elevation view of another example of the covering of FIG. 1A as the cells transition from open to closed.
Figure 12C:
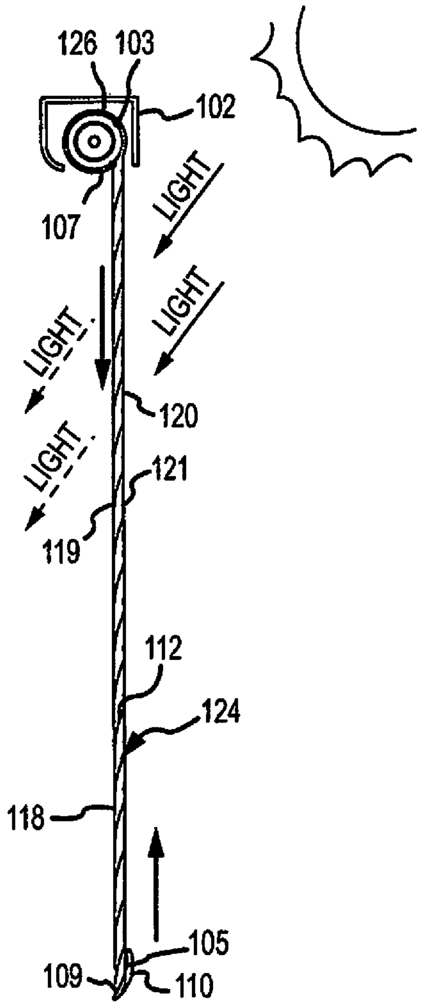
FIG. 12C is a side elevation view of another example of the covering of FIG. 1B with the end cap removed.

In some examples, the covering 100 may be oriented to allow light to be admitted through the gaps 124 or spaces between the cells 112. FIG. 12A is a side elevation view of another example of the covering of FIG. 1A with an end cap removed from the head rail. FIG. 12B is a side elevation view of another example of the covering of FIG. 1A as the cells transition from open to closed. FIG. 12C is a side elevation view of another example of the covering of FIG. 1B with the end cap removed. With reference to FIGS. 12A-12C, in these examples, the panel 104 may extend off of a rear side of the roller 126. In these examples, the rear sheet 120 may support the top end of the cells 112 whereas the front sheet 118 may support the bottom end of the cells 112.

In examples where the architectural opening may be a window, the orientation of the panel 104 onto the roller 126 as shown in FIGS. 12A-12C, allows light (e.g., from the sun) to enter through the front sheet 118 through the gaps 124. On the contrary, with brief reference to FIGS. 2B and 2C, light entering through the rear sheet 120 may be blocked from exiting through the front sheet 118 by the vanes 114, 116. This is because in the example illustrated in FIGS. 2B and 2C, as the cells 112 are closed, the top end of the cells 112 may be operably connected to the front sheet 118, such that the cells 112 extend from the front sheet 118 downward towards the rear sheet 120. Accordingly, light entering the panel 104 through the rear sheet 120 may encounter the cell 112 material for one or more cells 112, which as discussed with respect to FIG. 4B may diffuse light.

However, with reference to FIGS. 12A-12C, as the roller 126 is actuated to close the cells 112, the rear sheet 120 may be vertically displaced with respect to the front sheet 118. As this occurs, the interior volume of the cells 112 decrease in size, as shown in FIG. 12B. The ends of each of the vanes 114, 116 connected to the rear sheet are moved upwards relative to the front sheet 118 and the vanes 114, 116 extend downwards from the rear sheet 120 to connect with the front sheet 118 (opposite of the example illustrated in FIGS. 2A-2C). This vane orientation allows light from a light source (such as the sun) to be transmitted through the gaps 124 without substantially being blocked.

When the panel 104 extends from the rear side of the roller, as shown in FIGS. 12A-12C, the cells 112 may allow light through the panel 104 even as they transition from an open position to a closed position. Although light may be admitted through the gaps 124, as the cells 112 transition to the closed position, the vane material may provide privacy. For example, in some implementations the front and rear sheets may be translucent or sheet material, whereas the vanes 114, 116 may be a non-translucent or less translucent material. As the cells 112 are closed, the vanes 114, 116 may be oriented vertically to reduce visibility through the panel 104. Due to the orientation of the top ends of the cells 112, the cells 112 may still allow light to be transmitted through the gaps 124. Thus, in a partially closed position, privacy may be enhanced as compared to an open position, but the amount of light transmitted through the panel 104 may be substantially the same or only slightly attenuated.

In instances where more light may be desired to be admitted through the panel 104, the panel 104 may be oriented such that the rear sheet 120 may increase vertically relative to the front sheet 118 to close the cells 112. This orientation and cell transition may allow light to be transmitted through gaps 124 defined between the cells 112, but may still provide for privacy as the vanes may block (or obscure) visibility through the panel 104.

CONCLUSION

The foregoing description has broad application. For example, while examples disclosed herein may focus on the coverings for architectural openings, it should be appreciated that the concepts disclosed herein may equally apply to other apparatuses or devices where varying light transmissvity may be desired. Similarly, although the covering may be discussed with respect a loop control cord, the devices and techniques disclosed herein are equally applicable to other types of control cords or operating elements. Accordingly, the discussion of any embodiment is meant only to be exemplary and is not intended to suggest that the scope of the disclosure, including the claims, is limited to these examples.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

What is claimed is:

1. A flexible panel for an architectural opening, said flexible panel comprising:

a front exterior vertical support member having a height and width;

a rear exterior vertical support member having a height and a width, the rear exterior vertical support member moveable relative to the front exterior vertical support member;

a plurality of flexible vane cells; and a plurality of gap cells different from the vane cells;

wherein:

each flexible vane cell is formed of a pair of a top vane portion and a bottom vane portion where each top vane portion and bottom vane portion extends from the front exterior vertical support member to the rear exterior vertical support member, each flexible vane cell is separately formed as an expandable and flexible tube that encloses an interior space and each separately formed expandable flexible tube is connected by a first connection member to the front exterior vertical support member and connected by a second connection member to the rear exterior vertical support member, wherein the pair of the top vane portion and the bottom vane portion are formed of a flexible material interconnected together by at least one vane connection member and the expandable flexible tube and the interior space expands or contracts in response to moving the front and rear exterior support members further apart or closer together while the flexible panel is in a fully extended position;

each gap cell formed by a portion of the front exterior support member, a portion of the rear exterior support member, the bottom vane portion from a top vane cell, and the top vane portion from a bottom vane cell; and both the plurality of flexible vane cells and the plurality of gap cells are spaced along the height of the front exterior vertical support member and the rear exterior vertical support member when the front exterior vertical support member and the rear vertical support member are spaced apart from each other.

2. The panel of claim 1, wherein in the fully extended position:

each flexible vane cell has a vane cell height along the front and rear exterior vertical support members;

each gap cell has a gap cell height along the front and rear exterior vertical support members;

wherein the flexible vane cell height is different from the gap cell height.

3. The panel of claim 2, wherein the gap cell height is greater than the flexible vane cell height.

4. The panel of claim 1, wherein the plurality of flexible vane cells alternate with the plurality of gap cells along the height of the front and rear exterior support members.

5. The flexible panel of claim 1, wherein at least one of the front exterior vertical support member or the rear exterior vertical support member is formed of a sheer material that permits light to pass therethrough.

6. The flexible panel of claim 5, wherein both of the front exterior vertical support member and the rear exterior vertical support member are formed of a sheer material that permits light to pass therethrough.

7. The flexible panel of claim 1, wherein one of the front or rear exterior vertical support member is formed of a material of higher light transmissivity than the material forming either one of the pair of the top vane portion or the bottom vane portion forming each flexible vane cell.

8. The flexible panel of claim 1, wherein the pair of the top vane portion and the bottom vane portion forming each flexible vane cell are substantially similarly shaped when the front exterior vertical support member is spaced apart from the rear exterior vertical support member.

9. The flexible panel of claim 1, wherein the pair of the top vane portion and bottom vane portion forming each flexible vane cell are substantially parallel and substantially similarly shaped when the flexible panel is in a collapsed configuration where the front exterior vertical support member is positioned next to the rear exterior vertical support member.

10. The flexible panel of claim 1, wherein each flexible vane cell is formed of multiple pieces of material.

11. The flexible panel of claim 1, wherein each flexible vane cell is formed of a continuous sheet of material separate from either of the front vertical support member and the rear vertical support member wherein each continuous sheet of material is overlapped onto itself and connected together by the at least one vane connection member.

12. The flexible panel of claim 1, wherein each flexible vane cell is formed of the top vane portion and corresponding bottom vane portion coupled together by adhesive to separately form each expandable and flexible tube that completely encloses the interior space of each respective flexible vane cell.

13. The flexible panel of claim 1, wherein at least one of the top vane portion, the bottom vane portion, or both the top vane portion and bottom vane portion of each flexible vane cell includes multiple layers.

14. The flexible panel of claim 1, wherein the first connection member and the second connection member are each adhesive.

15. The flexible panel of claim 1, wherein each of the plurality of flexible vane cells has at least one of a first group consisting of a first crease, a first fold line, a first tip, and a first apex such that the top vane portion and the corresponding bottom vane portion of each flexible vane cell forms an acute angle with the interior space of its respective flexible vane cell, the at least one of the first group being adjacent to, spaced from, and not directly connected to at least one of the front or rear exterior vertical support members.

16. The flexible panel of claim 15, wherein each flexible vane cell has at least one of a second group consisting of a second crease, a second fold line, a second tip, and a second apex such that the top vane portion and the corresponding bottom vane portion of each flexible vane cell forms an acute angle with the interior space of its respective flexible vane cell, and one of the front or rear exterior support members is adjacent to and spaced from the at least one of the first group and the other one of the front or rear exterior support members is adjacent to, spaced from, and not directly attached to the second group.

17. The flexible panel of claim 1, wherein the top vane portion forming one of the respective flexible vane cells is connected directly to at least one of the front exterior vertical support member or the rear exterior vertical support member at only the first connection member, and the bottom vane portion forming the respective flexible vane cell is connected directly to the other one of the front exterior vertical support member or the rear exterior vertical support member at only the second connection member.

18. The flexible panel of claim 1, further comprising a roller, and the front and rear exterior vertical support members are attached to and are configured to wind and unwind around the roller.

19. The flexible panel of claim 18, further comprising a bottom rail coupled to one of the front or rear exterior vertical support members.

20. The flexible panel of claim 1, wherein each flexible vane cell is formed of a sheet of material separate and different from and having less light transmissivity than either of the front exterior vertical support member or the rear exterior vertical support member, the sheet of material forming the expandable flexible tube and completely enclosing the interior space without requiring any portion of the front exterior vertical support member or the rear exterior vertical support member, each expandable flexible tube having at least a first fold line such that the top vane portion and the corresponding bottom vane portion of each flexible vane cell forms an acute angle with the interior space of its respective flexible vane cell, the at least a first fold line being adjacent to, spaced from, and not directly connected to at least one of the front or rear exterior vertical support members, wherein the first connection member is adjacent the first fold line, is an adhesive, and is spaced from the first fold line and the second connection member.

21. The flexible panel of claim 1, wherein each separately formed flexible vane cell is constructed from at least two pieces of material that are coupled together by adhesive in at least two locations.

22. The flexible panel of claim 21, wherein the at least two pieces of material forming each separately formed flexible vane cell each have a first end portion and a second end portion and the top vane portion is formed of a first piece of the at least two pieces of material and the bottom vane portion is formed of a second piece of the at least two pieces of material, and the first end portion of the first piece of material is adhesively coupled to the first end of the second piece of material and the second end portion of the first piece of material is adhesively coupled to the second end portion of the first piece of material.

23. The flexible panel of claim 1, wherein the first connection member, the second connection member, and the vane connection member are each at least one of a connection group consisting of at least: an adhesive, a fastener, sewing, hook and loop, and combinations thereof.

24. The flexible panel of claim 1, wherein the front exterior vertical support member and the rear exterior vertical support member function as operating elements to expand and contract the interior space of the plurality of vane cells.

25. A flexible panel for an architectural opening, said flexible panel comprising:

- a front exterior vertical support member having a height and width, the front exterior vertical support member formed from a material that permits light to pass therethrough;
- a rear exterior vertical support member having a height and a width, the rear exterior vertical support member formed of a material that permits light to pass therethrough; and
- a plurality of flexible vane cells, each flexible vane cell extending along the width of the exterior vertical support members and formed separately from the front exterior vertical support member and from the rear exterior vertical support member and having a pair of a top vane portion and a bottom vane portion, the top and bottom vane portions forming a wall that encloses an interior cavity and defines an enclosed flexible tube without requiring any portion of the front exterior vertical support member or the rear exterior vertical support member, the enclosed flexible tube extends along the width of the front and rear exterior vertical support members, wherein the bottom vane portion of each separately formed flexible vane cell is connected by a first connection member to one of the front or rear exterior vertical support members and the top vane portion of each separately formed flexible vane cell is connected by a second connection member to the other of the front or rear exterior vertical support members;

wherein:

- each flexible vane cell of the plurality of flexible vane cells is spaced apart from an adjacent flexible vane cell along the height of the front and rear exterior vertical support members to form a gap between adjacent flexible vane cells;
- each gap allows light to be transmitted uninterrupted therethrough perpendicularly from one of the front or rear exterior vertical support members to the other of the front or rear exterior vertical support members when the front and rear exterior vertical support members are spaced apart from each other;
- the enclosed flexible tube and the interior cavity expands or contracts in response to moving the front and rear exterior vertical support members further apart or closer together while the flexible panel is in a fully extended position; and
- the front and rear exterior vertical support members being formed of a material that light passes more readily through than at least one of the pair of the top vane portion and the bottom vane portion of each flexible vane cell.

26. The panel of claim 25, wherein the height of the gap between adjacent vane cells along the front and rear exterior vertical support members is different from the height of the flexible vane cells along the front and rear exterior vertical support members.

27. The flexible panel of claim 26, wherein the height of the gap is greater than the height of the plurality of flexible vane cells along the front and rear exterior vertical support members when the front and rear exterior vertical support members are spaced apart from each other.

28. The flexible panel of claim 25, wherein the material forming each flexible vane cell is connected to the front exterior vertical support member at only one location, and connected to the rear exterior vertical support member at only one location.

29. The flexible panel of claim 25, wherein each of the plurality of flexible vane cells has at least a first group consisting of a first crease, a first fold line, a first tip, and a first apex such that the top vane portion and the corresponding bottom vane portion of each flexible vane cell forms an acute angle with the interior cavity of its respective flexible vane cell, the top vane portion of each respective flexible vane cell is connected to the front exterior vertical support member at a first location by the first connection member, and the first group is adjacent the front exterior vertical support member, spaced from the first location, and not directly connected to either of the front or rear exterior vertical support members.

30. The flexible panel of claim 25, wherein the plurality of flexible vane cells are formed of a different and less translucent material than the front and rear exterior vertical support members.

31. The flexible panel of claim 25, wherein at least one of the front exterior vertical support member or the rear exterior vertical support member is formed of a sheer material that permits light to pass therethrough.

32. The flexible panel of claim 29, wherein:

each flexible vane cell has a second group consisting of a second crease, a second fold line, a second tip, and a second apex such that the top vane portion and the corresponding bottom vane portion of each flexible vane cell forms an acute angle with the interior of its respective flexible vane cell, and the bottom vane portion of each respective flexible vane cell is connected to the rear exterior vertical support member at a second location by the second connection member; and one of the first location or the second location is adjacent to and spaced from the first group and the other one of the first location or the second location is adjacent to and spaced from the second group, and the second group is not directly connected to the other one of the front or rear vertical support members.

33. The flexible panel of claim 25, wherein the flexible panel, including the plurality of flexible vane cells, is configured to be sufficiently flexible to wind around a roller.

34. The flexible panel of claim 25, wherein the first connection member and the second connection member are adhesive.

35. The flexible panel of claim 25, wherein each separately formed flexible vane cell is formed of multiple pieces of material.

36. The flexible panel of claim 25, wherein each separately formed flexible vane cell is formed of a continuous sheet of material separate from either the front vertical support member and the rear vertical support member wherein each continuous sheet of material is overlapped onto itself and connected together.

37. The flexible panel of claim 25, wherein each separately formed flexible vane cell is formed of the top vane portion and the corresponding bottom vane portion coupled together by adhesive to separately form each expandable and flexible tube that completely encloses the interior space of each respective flexible vane cell.

38. The flexible panel of claim 25, wherein each separately formed flexible vane cell is constructed from at least two pieces of material that are coupled together by adhesive in at least two locations.

39. The flexible panel of claim 38, wherein the at least two pieces of material forming each separately formed flexible vane cell each have a first end portion and a second end portion and the top vane portion is formed of a first piece of the at least two pieces of material and the bottom vane portion is formed of a second piece of the at least two pieces of material, and the first end portion of the first piece of material is adhesively coupled to the first end of the second piece of material and the second end portion of the first piece of material is adhesively coupled to the second end portion of the first piece of material.

40. The flexible panel of claim 25, wherein the top vane portion and the bottom vane portion are interconnected together by at least one vane connection member.

41. The flexible panel of claim 40, wherein the first connection member, the second connection member, and the vane connection member are each at least one of a connection group consisting of at least: an adhesive, a fastener, sewing, hook and loop, and combinations thereof.

42. The flexible panel of claim 25, wherein the front exterior vertical support member and the rear exterior vertical support member function as operating elements to expand and contract the interior cavity of the plurality of vane cells.

43. A flexible panel for an architectural structure, said flexible panel comprising:

a front exterior vertical support member having a height and width;

a rear exterior vertical support member having a height and a width; and a plurality of flexible vane cells, each flexible vane cell extending along the width of the front and rear exterior vertical support members and formed of flexible material separate from the front exterior vertical support member and separate from the rear exterior vertical support member, the plurality of separately formed flexible vane cells each having a top vane portion and a bottom vane portion formed of the flexible material interconnected by at least one vane connection member, the bottom vane portion adhesively connected to one of the front or rear exterior vertical support members, the top vane portion adhesively connected to the other one of the front or rear exterior vertical support members, and the top and bottom vane portions forming a wall that encloses an interior cavity that extends along the width of the front and rear exterior vertical support members, wherein each flexible vane cell of the plurality of flexible vane cells is spaced apart from an adjacent flexible vane cell along the height of the front and rear exterior vertical support members to form a gap between adjacent flexible vane cells, wherein the interior cavity enclosed by the top and bottom vane portions expands or contracts in response to moving the front and rear exterior vertical support members further apart or closer together while the flexible panel is in a fully extended position; and wherein the flexible panel, including the plurality of flexible vane cells, is configured to be sufficiently flexible to be wound around a roller to retract the flexible panel from covering an architectural structure.

44. The panel of claim 43, wherein the height of the gap between adjacent flexible vane cells along the front and rear exterior support members is different from the height of the flexible vane cells along the front and rear exterior vertical support members when the front and rear exterior vertical support members are spaced apart from each other.

45. The flexible panel of claim 44, wherein the height of the gap is greater than the height of the flexible vane cells along the front and rear exterior vertical support members when the front and rear exterior vertical support members are spaced apart from each other.

46. The flexible panel of claim 43, wherein each gap allows light to be transmitted uninterrupted therethrough from one of the front or rear exterior vertical support members perpendicularly to the other of the front or rear exterior vertical support members when the front and rear exterior vertical support members are spaced apart from each other.

47. The flexible panel of claim 43, wherein each flexible vane cell is directly connected to the front exterior vertical support member at only one location, and is directly connected to the rear exterior vertical support member at only one location.

48. The flexible panel of claim 47, wherein each of the plurality of flexible vane cells has at least a first group consisting of a first crease, a first fold line, a first tip and a first apex such that the top vane portion and the corresponding bottom vane portion of each flexible vane cell forms an acute angle with the interior cavity of its respective flexible vane cell, and the top vane portion is connected to one of the front or rear exterior vertical support members at only a first location, and the first group is adjacent to and spaced from the first location.

49. The flexible panel of claim 43, wherein at least one of the front exterior vertical support member or the rear exterior vertical support member is formed of a sheer material that permits light to pass therethrough.

50. The flexible panel of claim 43, wherein the plurality of flexible vane cells are formed of a less translucent and different material than the front and rear exterior vertical support members.

51. The flexible panel of claim 48, wherein each flexible vane cell has a second group consisting of a second crease, a second fold line, a second tip, and a second apex such that the top vane portion and the corresponding bottom vane portion of each flexible vane cell forms an acute angle with the interior cavity of its respective flexible vane cell and the bottom vane portion is connected to the other of the front or rear exterior vertical support members at only a second location, and one of the first location or the second location is adjacent to and spaced from the first group and the other one of the first location or the second location is adjacent to and spaced from the second group, and the second group is not directly connected to the other one of the front or rear exterior vertical support members.

52. The flexible panel of claim 43, further comprising a roller, and the front and rear exterior support members are attached to the roller and the front and rear exterior support members, including the plurality of flexible vane cells, are configured to wind and unwind around the roller.

53. The flexible panel of claim 43, wherein each flexible vane cell is formed of a sheet of material separate and different from and having less light transmissivity than either of the front exterior vertical support member or the rear exterior vertical support member, the sheet of material forming the wall that encloses the interior cavity forming an expandable tube without requiring any portion of the front exterior vertical support member or the rear exterior vertical support member, each expandable tube having at least a first fold line such that the top vane portion and the corresponding bottom vane portion of each flexible vane cell forms an acute angle with the interior cavity of its respective flexible vane cell, the at least a first fold line being adjacent to, spaced from, and not directly connected to at least one of the front or rear exterior vertical support members, wherein the first connection member is adjacent the first fold line, is an adhesive, and is spaced from the first fold line and the second connection member.

54. The flexible panel of claim 43, wherein each separately formed flexible vane cell is formed of multiple pieces of material.

55. The flexible panel of claim 43, wherein each separately formed vane cell is formed of a continuous sheet of material separate from either the front vertical support member and the rear vertical support member wherein each continuous sheet of material is overlapped onto itself and connected together by the at least one vane connection member.

56. The flexible panel of claim 43, wherein each separately formed flexible vane cell is formed of the top vane portion and the corresponding bottom vane portion coupled together by adhesive to separately form each expandable and flexible tube that completely encloses the interior space of each respective flexible vane cell.

57. The flexible panel of claim 43, wherein each separately formed flexible vane cell is constructed from at least two pieces of material that are coupled together by adhesive together in at least two locations.

58. The flexible panel of claim 57, wherein the at least two pieces of material forming each separately formed flexible vane cell each have a first end portion and a second end portion and the top vane portion is formed of a first piece of the at least two pieces of material and the bottom vane portion is formed of a second piece of the at least two pieces of material, and the first end portion of the first piece of material is adhesively coupled to the first end of the second piece of material and the second end portion of the first piece of material is adhesively coupled to the second end portion of the first piece of material.

59. The flexible panel of claim 43, wherein the first connection member, the second connection member, and the vane connection member are each at least one of a connection group consisting of at least: an adhesive, a fastener, sewing, hook and loop, and combinations thereof.

60. The flexible panel of claim 43, wherein the front exterior vertical support member and the rear exterior vertical support member function as operating elements to expand and contract the interior cavity of the plurality of vane cells.

* * * * *